(12) United States Patent  
Croxford et al.

(10) Patent No.: US 7,991,960 B2  
(45) Date of Patent: Aug. 2, 2011

(54) ADAPTIVE COMPARISON CONTROL IN A DATA STORE

(75) Inventors: Daren Croxford, Cambridge (GB); Timothy Fawcett Milner, Cambridge (GB)

(73) Assignee: ARM Limited, Cambridge (GB)

( * ) Notice: Subject to any disclaimer, the term of this patent is extended or adjusted under 35 U.S.C. 154(b) by 506 days.

(21) Appl. No.: 12/230,333

(22) Filed: Aug. 27, 2008

(65) Prior Publication Data

US 2009/0100054 A1 Apr. 16, 2009

Related U.S. Application Data

(63) Continuation-in-part of application No. 11/545,758, filed on Oct. 11, 2006, now Pat. No. 7,640,397.

(51) Int. Cl.  
*G06F 12/00* (2006.01)

(52) U.S. Cl. ......... 711/130; 711/147; 711/118; 711/148

(58) Field of Classification Search .................. 711/130, 711/147, 118, 148

See application file for complete search history.

(56) References Cited

U.S. PATENT DOCUMENTS

| 4,996,641 | A | | 2/1991 | Talgam et al. |
| 5,471,605 | A | * | 11/1995 | Ruby ............................. 711/118 |
| 5,845,325 | A | | 12/1998 | Loo et al. |
| 6,606,684 | B1 | | 8/2003 | Ramagopal et al. |

OTHER PUBLICATIONS

Office Action mailed Jan. 23, 2009 in co-pending U.S. Appl. No. 11/545,758.
Loghi et al., "Tag Overflow Buffering: An Energy-Efficient Cache Architecture", *Computer Society*, 2005.
Petrov et al., Data Cache Energy Minimizations Through Programmable Tag Size Matching to the Applications, *Computer Science & Engineering Dept. of University of California*, Oct. 2001, pp. 113-117.
U.S. Appl. No. 11/545,758, filed Oct. 11, 2006, Croxford et al.

* cited by examiner

*Primary Examiner* — Jae U Yu
(74) *Attorney, Agent, or Firm* — Nixon & Vanderhye P.C.

(57) ABSTRACT

Data store access circuitry is disclosed that comprises: a data store for storing values; comparator circuitry coupled to said data store and responsive to receipt of a data access request comprising an address to compare at least a portion of said address with at least a portion of one or more of said values stored in said data store so as to identify a stored value matching said address; a base value register coupled to said comparator circuitry and storing a base value corresponding to at least a portion of at least one of said stored values; and comparator control circuitry coupled to said comparator circuitry to control: (i) which portion of said address is processed as a non-shared portion and compared by said comparator circuitry with non-shared portions of said one or more stored values stored in said data store; and (ii) which portion of said address is processed as a shared portion and compared by said comparator circuitry with a shared portion of said base value stored in said base value register; wherein said shared portion of said base value has a value matching corresponding portions of all of said stored values stored within said data store.

21 Claims, 9 Drawing Sheets

TAG Comparisons

ADAPTIVE COMPARISON CONTROL IN A DATA STORE

CROSS-REFERENCE TO RELATED APPLICATION

This is a continuation-in-part of commonly-owned U.S. patent application Ser. No. 11/545,758 filed on 11 Oct. 2006, now U.S. Pat. No. 7,640,397 the entire contents of which is hereby incorporated by reference.

BACKGROUND OF THE INVENTION

1. Field of the Invention

This invention relates to the field of data processing systems. More particularly, this invention relates to data stores within data processing systems and the adaptive control of comparisons performed with data stored therein.

2. Description of the Prior Art

Data stores associated with a processor consume a significant proportion of the power consumption of that processor and memory combination. Caches in particular typically employ large fast and power hungry transistors and other circuit elements, in order to achieve high performance operation. Caches are commonly used within processing apparatus. One example of their use is in address translation circuitry for translating virtual to physical addresses. In such circuitry a physical address corresponding to a virtual address is found using a cache TAG lookup operation. This lookup operation consumes a significant amount of power. As the number of cache ways increases, the cache TAG lookup consumption becomes greater.

As mentioned above, cache TAG lookup accounts for a significant proportion of cache memory power consumption. It has been recognised that in many circumstances, particularly in the embedded device market segment, the memory footprint (i.e. range of memory locations accessed) is frequently significantly less than the processor's address range. This is also a characteristic of high-end applications where wide 64-bit address space is provided, with relatively little of this address space in practise being used. "TAG Overflow Buffering: An Energy-Efficient Cache Architecture" by Mirko Loghi, Paolo Azzoni and Massimo Poncino discloses a scheme in which an application program is profiled to determine the gross locality of the code concerned. The cache memory is then designed with a TAG width depending upon the profile results. A special register (the TAG Overflow Buffer (TOB)), is programmed with the current locality by the processor. Transfers that are within this region of memory are cached. Transfers from outside this region are not cached. This scheme requires that the cache be designed for a particular application (that is known in advance) and that software be written with the ability to update the TOB this scheme also results in lower performance (and higher power consumption) for transactions which fall outside the TOB region. "Data Cache Energy Minimisation Through Programmable TAG Size Matching to the Applications" by Peter Petrov and Alex Orailoglu discloses a scheme in which the TAG length for a particular section of code is determined. This value is programmed into a register by a processor before the said section of code concern is executed. The scheme uses a special RAM array where bit lines can be disabled depending upon the value programmed into the register. This scheme requires the code to be analysed in advance and additional instructions to be written to program the TAG width (limiting where the scheme can be used). This scheme also reduces the processor performance due to the additional instructions that must be executed.

It will be appreciated that whilst the above schemes can exploit the address locality associated with many real life patterns of memory accesses, they suffer from the disadvantage that the application programs concerned must be modified to control the hardware in an appropriate manner for the application program concerned. This represents an additional burden to the programmer and means that the techniques cannot be used with existing legacy code.

SUMMARY OF THE INVENTION

A first aspect of the present invention provides data store access circuitry comprising: a data store for storing values; comparator circuitry coupled to said data store and responsive to receipt of a data access request comprising an address to compare at least a portion of said address with at least a portion of one or more of said values stored in said data store so as to identify a stored value matching said address; a base value register coupled to said comparator circuitry and storing a base value corresponding to at least a portion of at least one of said stored values; and comparator control circuitry coupled to said comparator circuitry to control: (i) which portion of said address is processed as a non-shared portion and compared by said comparator circuitry with non-shared portions of said one or more stored values stored in said data store; and (ii) which portion of said address is processed as a shared portion and compared by said comparator circuitry with a shared portion of said base value stored in said base value register; wherein said shared portion of said base value has a value matching corresponding portions of all of said stored values stored within said data store.

The present invention recognises that in many devices the virtual and or physical application address memory footprint is less than the processor's virtual and physical address range. Thus, there are "shared" portions of the addresses that hold a same value for all addresses used by access requests. The present invention identifies at least a part of this shared portion of the address that will not change and does not use this part in its comparison with the stored address. Reducing the number of bits of the input value which have to be compared with one or more stored values reduces the power consumption needed for the comparison. A comparison of the at least a part of the shared portion that was not compared with the stored value can be made against the corresponding portion of the base value within a base value register. This is because it is known that this portion is the same as the corresponding portion of all the values stored in the data store. Furthermore, this is a power efficient comparison compared to comparisons made with stored values.

However, the system is such that a full comparison with up to the full stored values can be made if needed thereby avoiding the requirement for pre-programming or pre-configuring of the data store based upon an analysis of activity that may yet need to be performed. This enhances the generality and backwards compatibility of the technique.

In some embodiments, the data store access circuitry further comprises write circuitry coupled to said data store to write respective stored values; a mask register for storing a mask value; and wherein said comparator control circuitry comprises a comparator and said comparator control circuitry is responsive to receipt of each stored value being written to said data store to compare said address with said base value and to update said mask value by adding identifiers to said mask value identifying any bits of said address and base value that do not match; said comparator control circuitry determining said non-shared portion as said portion corresponding to said identifiers of said mask and said shared portion of said address as said portion corresponding to said other portion of said mask.

Although the non-shared portion and shared portion can be determined in a number of ways, a masked value is a particularly effective way of determining the non-shared portion. It takes advantage of the fact that every time a value is written to the data store this address can be compared with an address value stored in the base value register and any bits of the address and base values that do not match are then clearly non-shared portions and as such the mask can be updated to indicate the non-shared portion. In this way as more data values are written to the data store any non matching bits are identified as non-shared portions and thus, the base value stored in the register can be used along with the mask to determine exactly which bits are shared and which bits are non-shared.

Although the comparator control circuitry which controls which bits of the address are to be treated as shared and non-shared portions can be separate to the comparator circuitry; which may be advantageous where it is desirable to use it not just with this comparator circuitry but with other comparator circuitry, in some embodiments it is within the comparator circuitry itself.

Although the data store may take a number of forms, in some embodiments said data store comprises a plurality of rows, each of said plurality of rows being divided into a plurality of multi-bit portions, each of said plurality of multi-bit portions being processed as storing either a shared stored value or a non-shared stored value for all of said plurality of rows.

Whilst it will be appreciated that which portions of each memory row are treated as storing either a shared value or a non-shared value can be controlled on a bit-by-bit basis, hardware efficiencies may be achieved with little reduction in the power saved by employing embodiments in which each of the plurality of rows are divided into multi-bit portions each processed as either "shared" or "non-shared".

In some embodiments, said comparator control circuitry selectively disables a multi-bit portion of all of said plurality of rows from being subject to a comparison by said comparator circuitry and being read when said multi-bit portion of all of said plurality of rows corresponds to at least a part of said shared portion of said base value.

If the data store has a fairly conventional arrangement with a plurality of rows then when the shared portion has been determined the comparator control circuitry can selectively disable the corresponding multi bit portion of all of the plurality of rows from being subject to a comparison as it knows that this will always be equal. Thus, an efficient comparison can be made and power can be saved by not enabling bits that are not required for the comparison.

In some embodiments, said data store is part of a cache memory.

Cache memories are generally formed from large fast and power hungry transistors as it is important that they are high performance devices. Thus, it is particularly advantageous to be able to disable portions of these memories when performing comparisons as this can save a significant amount of power.

In some embodiments, said data store is a cache TAG memory.

Comparisons in cache TAGs to identify addresses are common when accessing data in many devices and thus, being able to save power in such accesses by not enabling portions of the address that are common to all addresses that are already stored can be advantageous.

In some embodiments, said cache memory is a multi-way cache memory with a TAG memory for each cache way.

The power consumption of cache TAG memories is increased in multi-way cache memories and accordingly the present technique is particularly useful in this context.

In some embodiments, said cache TAG memory comprises a plurality of rows, each of said plurality of rows being divided into a plurality of RAMS, each of said plurality of RAMs, storing a same predetermined portion of a plurality of TAGs and each being processed as storing either a shared stored value or a non-shared stored value for all of said plurality of rows, wherein a RAM is identified as storing a non-shared stored value if any bits of said stored value are non-shared bits; said comparator control circuitry being configured to selectively disable at least one RAM from being subject to a comparison by said comparator circuitry and being read when said at least one RAM is identified as storing shared stored values.

It may be advantageous to split the TAG RAMs into multiple smaller RAMs, access to each RAM then being enabled or disabled as required. Using multiple narrow RAMs does not significantly affect gate count and enables individual RAMs to be enabled or disabled. As it is generally a multi-bit portion of the address that is the shared portion arranging the TAG RAMs in this way enables the TAG RAM(s) storing this shared portion of the address to be disabled as it is not required for the comparison thereby saving the power usually needed to drive that RAM.

In some embodiments, said comparator control circuitry selectively disables said at least one RAM by switching said RAM to low power mode where data is not lost.

Switching the RAM to low power mode ensures that the data in the RAM is not lost and yet a significant amount of power is saved.

In some embodiments, said base value and mask are cleared when said data store is flushed.

Whenever the data store is flushed the mask value and base value in the register may no longer be accurate for data that will be written to the data store and thus, in some embodiments they are flushed when the data store is flushed thereby ensuring that the value stored in the base value register and mask register correspond to the values stored in the data store.

In some embodiments, said base value is set to match a first stored value written to said data store following a flush.

One way of setting the value in the base value is to store therein the first stored value written to the data store following a flush. In effect, any value written to the data store can be stored in the base register as they all have the same shared value which is the important part of the value stored in the base register. However, given the way that this shared portion is identified using a mask and the way the mask is generated, it is effective if the first value stored to the data store is stored in the base value register and then the mask can be generated in dependence upon this value.

Although the cache memory can have a number of different forms, for example it could be a physically addressed cache, however the present technique is particularly useful when said cache memory is a virtually addressed cache memory and said cache TAG memory stores virtual address TAGs.

Such accesses are relatively power hungry and common in processors and the present technique is helpful in reducing the power needed to access a virtually addressed cache memory.

In some embodiments, said data store access circuitry comprises address translation circuitry for translating virtual addresses to physical addresses in response to access requests targeting virtual addresses, said virtually addressed cache memory comprising a plurality of data caches for storing a plurality of at least a portion of physical addresses in locations identified by at least a portion of said virtual address.

The present invention is particularly effective at improving the efficiency of address translation circuitry which is circuitry that is used in many devices.

In some embodiments, said data store access circuitry comprises address translation circuitry for translating an address in response to access requests targeting virtual addresses, said data store comprising logic for storing said one or more values, said one or more values comprising at least a portion of one or more physical addresses; wherein said address translation circuitry is adapted to disable read access to said data store logic storing said shared portion of said one or more values.

In some address translation circuitry there is a part of the address translation circuitry for example the µTLB that is formed from logic, for example from flops, and in such circuitry each device storing a bit can be disabled individually. Such an arrangement lends itself particularly well to embodiments of the present invention as each shared bit that is identified can be disabled thereby saving power.

It should be noted that the address translation circuitry could take a number of forms. For example, it may be a memory management unit and it may be formed in a number of stages. Thus it might convert the virtual address to an intermediate physical address with a further MMU converting the intermediate physical address to the physical address.

In some embodiments, said address translation circuitry is adapted to disable a data path for storing and accessing said shared portion of said one or more values.

In such an arrangement where each bit is individually controllable then the data path for storing and accessing the shared portion can be disabled for each bit of the shared portion. This disabling may be done by, for example, switching the logic forming that part of the data path to low power mode.

It should be noted that the access requests for accessing the data store may come from a processor or from other devices such as DMA controllers.

In some embodiments, said data store access circuitry is responsive to said data store being invalidated to clear said base value.

When address translation circuitry is used there are times when the data store is invalidated and updated with a new range of memory addresses, for example on a task switch when a different memory region may be accessed. In such a case it is advantageous to also clear the base value so that it will be correct for the new values that are stored in the data store.

A further aspect of the present invention provides a memory management unit comprising address translation circuitry for translating a received virtual address to a physical address comprising a translation lookaside buffer comprising a plurality of physical addresses stored in locations indicated by a corresponding plurality of virtual addresses; write circuitry coupled to said translation lookaside buffer to write respective stored physical addresses; and comparator control circuitry coupled to said memory management unit said comparator control circuitry comprising: mask register for storing a mask value; base value register for storing a base value corresponding to one of said stored physical addresses; a comparator; said comparator control circuitry being responsive to receipt of each stored physical address being written to said data store to compare said address with said base value and to update said mask value by adding identifiers to said mask value identifying any bits of said address and base value that do not match; said comparator control circuitry determining a non-shared portion of said physical address as said portion corresponding to said identifiers of said mask and said shared portion of said address as said portion corresponding to said other portion of said mask; said memory management unit being responsive to a read request to read said non-shared portion of said physical address and to output said non-shared portion.

This technique works particularly well for memory management units having address translation circuitry for translating virtual to physical addresses. The present invention recognises that the shared portion of the physical address stored in the TLB will be the same shared portion as that of the physical address in the corresponding data RAM. Thus, it realizes that the logic for determining the shared portion and disabling portions of the comparator circuit can be used in both accesses to the TLB and to the data RAM. This enables shared use of this circuitry and thereby improves gate count of such a device.

In some embodiments, said comparator control circuitry is within said memory management unit, while in other embodiments it is coupled to it.

A still further aspect of the present invention provides a memory coupled to memory management circuitry according to a further aspect of the present invention said memory comprising an input for receiving said non-shared portion of said physical address from said memory management circuitry and said mask value and base value from said comparator control circuitry and comprising: comparator circuitry coupled to said memory and responsive to receipt of said non-shared portion of said physical address to compare said received portion of said physical address with a corresponding portion of one or more of said values stored in said data store so as to identify a stored value matching said physical address.

As noted previously it may be that the logic forming the comparator control circuitry can be used in common for access to the physical addresses in the TLB buffer and to the physical address in the data RAM. Thus, a memory coupled to this memory management circuitry may have comparator circuitry that just compares the non-shared portion of the physical address and receives the mask value and base value from the comparator control circuitry coupled to the memory management circuitry.

A yet further aspect of the present invention provides a method of accessing a data store for storing values, said data store having a base value register for storing a base value corresponding to at least a portion of at least one of said stored values, said method comprising the steps of: receiving a data access request comprising an address; determining which portion of said address is to be processed as a non-shared portion and compared by said comparator circuitry with non-shared portions of said one or more stored values stored in said data store and which portion of said address is processed as a shared portion and compared by said comparator circuitry with a shared portion of said base value stored in said base value register, said shared portion of said base value has a value matching corresponding portions of all of said stored values stored within said data store; comparing said non-shared portion of said address with a corresponding portion of one or more of said values stored in said data store so as to identify a stored value matching said address; and comparing said shared portion of said address with said corresponding portion of said base value stored in said base value register.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
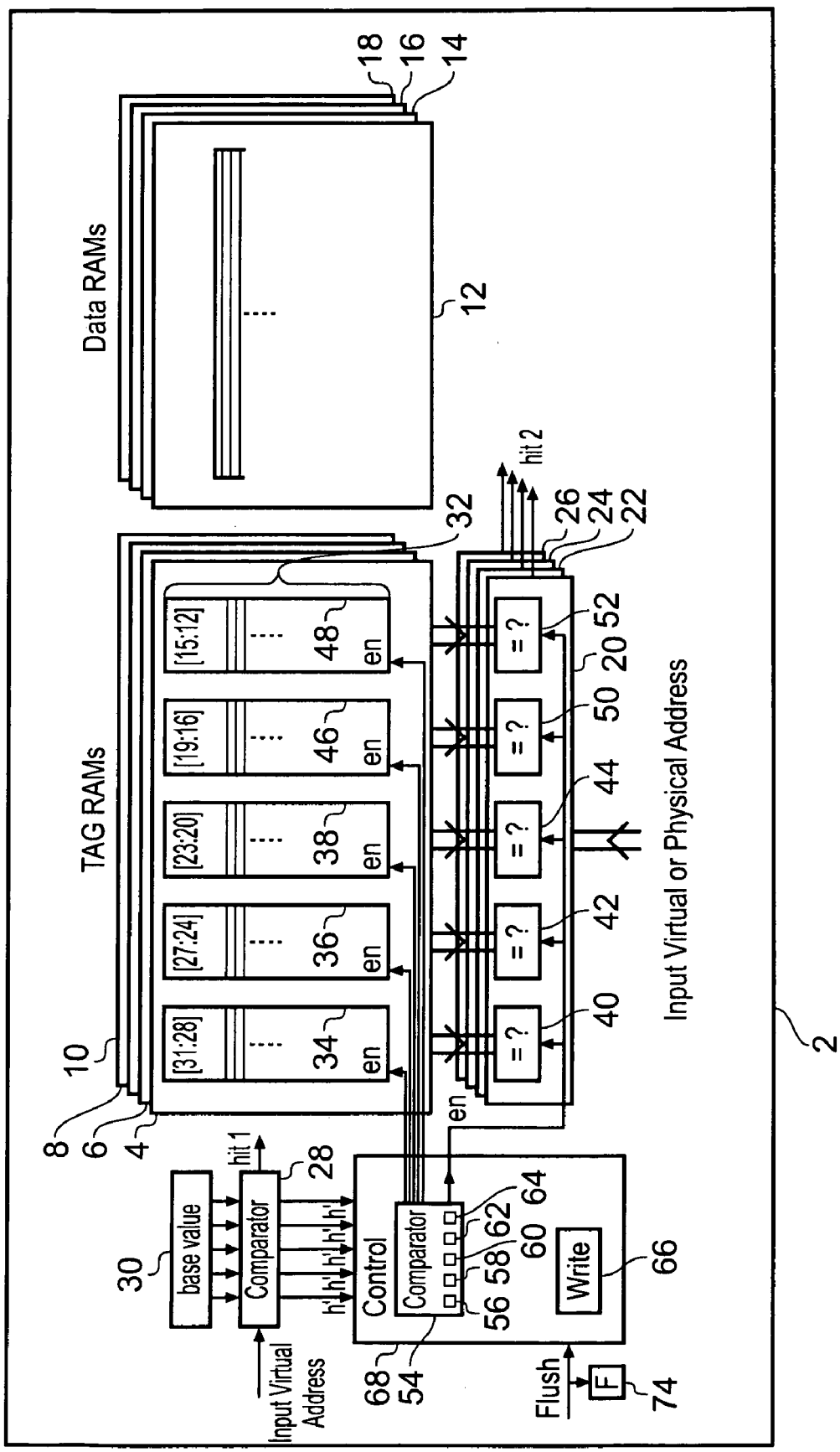
FIG. 1 schematically illustrates a multi-way cache.

FIG. 1 schematically illustrates a memory 2 in the form of a multi-way cache memory. This may, for example, be either an instruction cache memory or a data memory within a Harvard architecture system. Alternatively, the memory 2 may be a combined instruction and data memory (a von Neuman cache) within a processor system. It will be appreciated that a cache memory is only one example of the form of memory which may benefit from the present techniques The memory 2 is a 4-way memory with respective TAG RAMs 4, 6, 8, 10. These TAG RAMs 4, 6, 8, 10 are associated with corresponding data RAMs 12, 14, 16, and 18. The TAG RAMs 4, 6, 8, 10 and data RAMs 12, 14, 16, 18 provide a 4-way associative cache memory in which the data for a given memory address may be stored within any one of four memory rows respectively of the data RAMs 12, 14, 16, 18. The memory rows concerned are determined from a low order portion of the address which indexes into the appropriate rows of the TAG RAMs 4, 6, 8, 10. In these rows a TAG value which may or may not be the higher portion of the memory address concerned is stored and thus indicates whether or not the associated data value concerned is or is not cached within the data RAMs 12, 14, 16, 18.

In the example illustrated, the top twenty bits of a 32 bit memory address are stored within the TAG RAMs 4, 6, 8, 10. The comparison between an input virtual or physical address to be looked up within the cache memory 2 and the TAG values stored is performed by respective comparator circuitry 20, 22, 24, 26 for each of the TAG RAMs 4, 6, 8, 10. The comparator circuitry 20, 22, 24, 26 is responsible for comparing only those portions of the TAG values stored within the TAG RAMs 4, 6, 8, 10 which are not shared by all of the TAG values so stored. The shared portion of the TAG values stored is compared with the input virtual address by comparator circuitry 28 associated with a base value register 30 storing a base value. The different portions of the comparator circuitry 20, 22, 24, 26 and 28 are illustrated separately in this particular example embodiment, but it will be appreciated that they could be provided with one or more of these elements combined or with more elements, such as respective base value registers 30 and comparator circuitry 28 for each of the TAG RAMs (this can enable the possibility for some TAG RAMs to be locked down with critical code that is not in regular use).

As illustrated in FIG. 1, the twenty bits of the TAG values are divided into five 4-bit portions which are treated as either shared or not shared. Thus, for a shared portion, all of the plurality of memory rows 32 within the TAG RAM 4, 6, 8, 10 will have the same value for that portion and instead of comparing the corresponding bits of an input virtual address with the portion of the relevant TAG value as indexed by lower order portion of the virtual address, this shared portion can instead be checked against the corresponding portion of the base value stored within the base value register by the comparator circuitry 28. This saves energy accordingly, if, for example, the high order portion of the TAG values stored in bit positions [31:20] are all shared for each of the memory rows 32, then the sections 34, 36 and 38 of the TAG RAM 4 will not be enabled for comparison by the comparator circuitry 20 and the comparator blocks 40, 42 and 44 will not be used. The sections 46 and 48 within the TAG RAM 4 contain non-shared values and accordingly remain active and are read and compared by the comparison blocks 50, 52. In order to check that the input virtual address does indeed have its upper 12 bits corresponding to the values shared by the shared portion of the stored value, these upper twelve bits are compared in comparator circuitry 28 with the upper twelve bits of the base value stored within the base value register 30. In this way, the comparator control circuitry 54 is able to determine that the shared portion matches, such that this result (hit 1) can be ANDed with the comparison performed for the non-shared portion within the TAG RAMs 4, 6, 8, 10 (hit 2) and thus a combined hit signal generated which will either trigger a read within the relevant way of the data RAM 12, 14, 16, 18, or lead to cache miss and linefill. Latches 56, 58, 60, 62, 64 within the comparator control circuitry 54 control which of the portions of the stored values are treated as shared or non-shared and accordingly which of the comparison blocks 40, 42, 44, 50, 52 is active, and which of the sections of the TAG RAM 34, 36, 38, 46 and 48 are read, for any given comparison of an input electrical address.

If an input virtual address does not match those portions of the base value shared by all the proceeding stored values within the TAG RAMs 4, 6, 8, 10, as indicated by the mismatch detected by comparator circuitry 28, then the hit signals from this comparator circuitry 28 indicate this circumstance to the comparator control circuitry 54 and accordingly the corresponding latch 56, 58, 60, 62, 64 can be reset indicating that this portion of the stored value is no longer shared by all of the stored values within the TAG RAMs 4, 6, 8, 10. When the relevant data value having that non-matching address is fetched from the higher order memory systems, it is used to satisfy the cache miss as well as being written by write circuitry 66 into the cache 2 at that time. It will be normal that the shared portions and the non-shared portions will form contiguous regions of the stored values within the TAG RAMs 4, 6, 8, 10, i.e. the shared portions will typically be a continuous higher order portion of the stored TAG values, but this need not necessarily be the case depending upon the particular memory access characteristics of the system concerned.

As mentioned above, write circuitry 66 when writing a new stored value into the TAG RAMs 4, 6, 8, 10 in response to a cache miss will reset the appropriate ones of the latches 56, 58, 60, 62 and 64 which do not now correspond to portions of the TAG's having shared values for all the stored values within the TAG RAMs 4, 6, 8, 10. The comparator control circuitry 54 and the write circuitry 66 form part of a cache controller 68 which performs other control operations upon the cache memory in the conventional manner.

Figure 2:
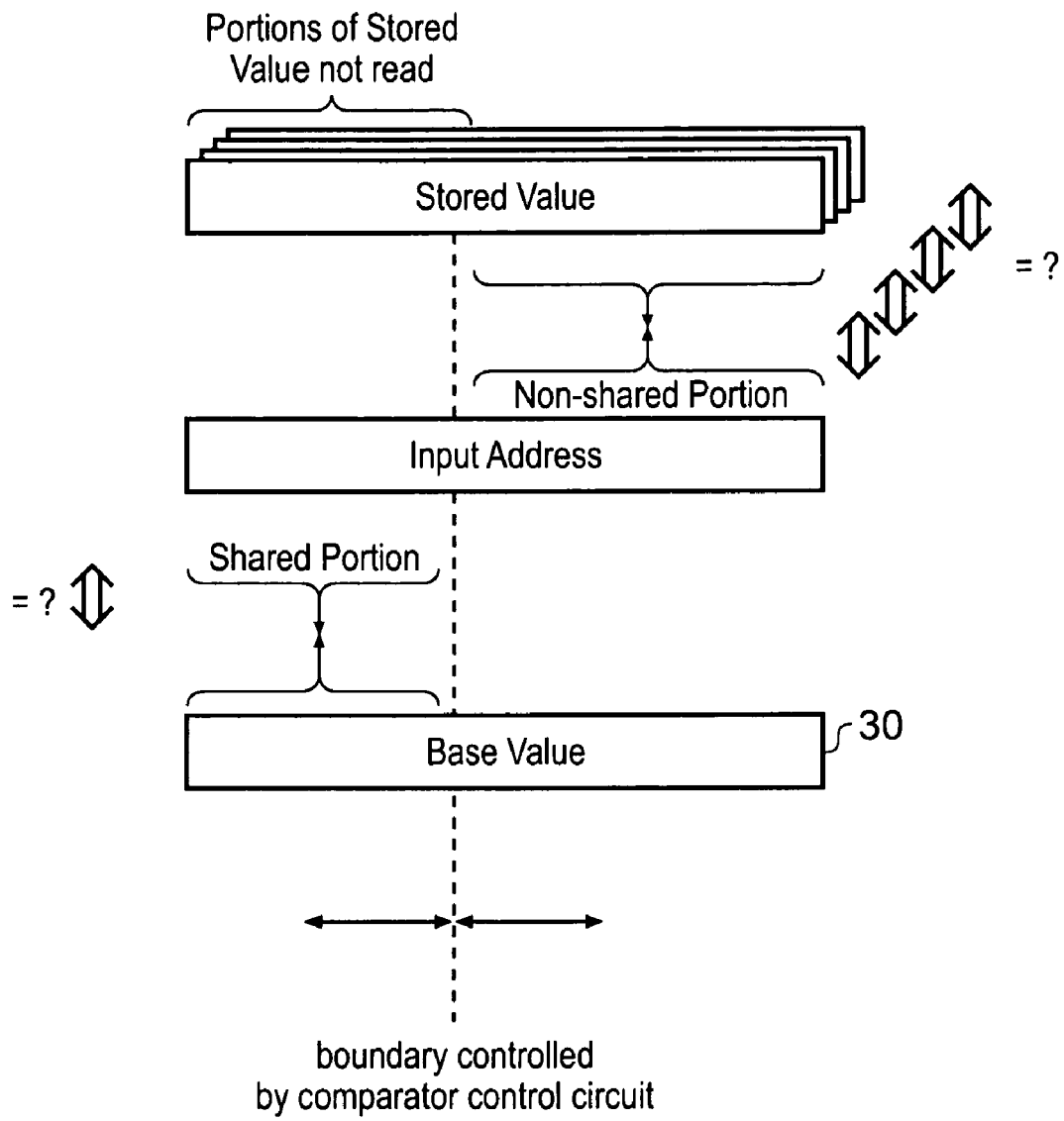
FIG. 2 schematically illustrates different portions of an input address being compared with a shared portion of a base value and with a non-shared portion of multiple stored values.

FIG. 2 schematically illustrates TAG comparisons performed with respect to an input address. A shared portion of the input address is compared against a base value stored within the base value register 30. The base value applies across all of the cache ways in this example embodiment. In alternative embodiments, separate base values can be provided for separate cache ways. In FIG. 1 the non-shared portion is compared by respective comparative circuitry 20, 22, 24, 26 against the stored values indexed by the lower order portion of the input virtual address in respect of the non-shared values within each of the indexed memory rows. The portions of the stored values which are shared are not read from the memory rows concerned. This is achieved by control of the enable signals supplied to each of the sections of the TAG RAM 34, 36, 38, 46, 48 by the comparator control circuitry 54 as illustrated in FIG. 1. The boundary between the shared portion and the non-shared portion is controlled by the comparator control circuitry 54 using the latches 56, 58, 60, 62, 64. This is illustrated as a single boundary in this example, although discrete multiple shared and non-shared portions are possible.

Figure 3A:
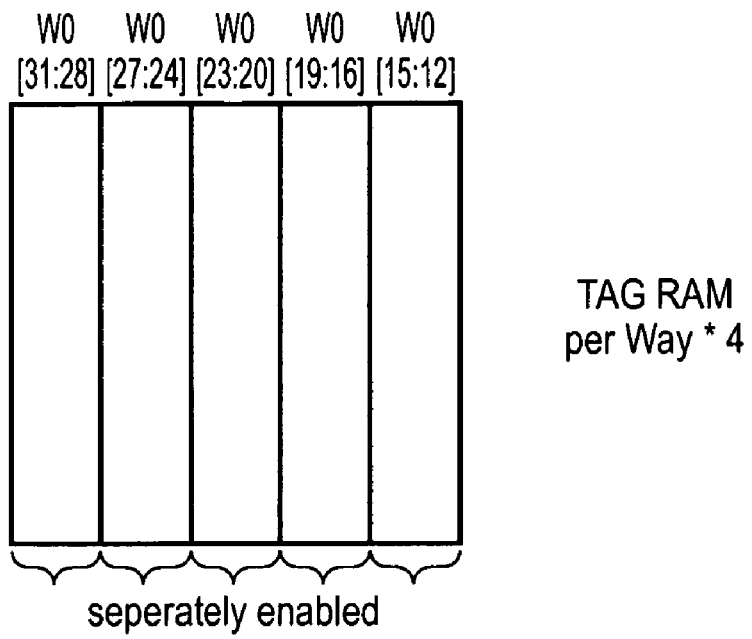
FIGS. 3A and 3B schematically illustrate two example illustrate embodiments of a TAG RAM arrangement.

FIG. 3A illustrates an example similar to that shown in FIG. 1 in which a TAG RAM is provided for each way of the cache memory 2. In the example shown, this is Way0 Each of five 4-bit sections of this TAG RAM can be separately enabled and disabled depending upon which portions of the stored values within that cache way are either shared all or at least one non-shared.

Figure 3B:
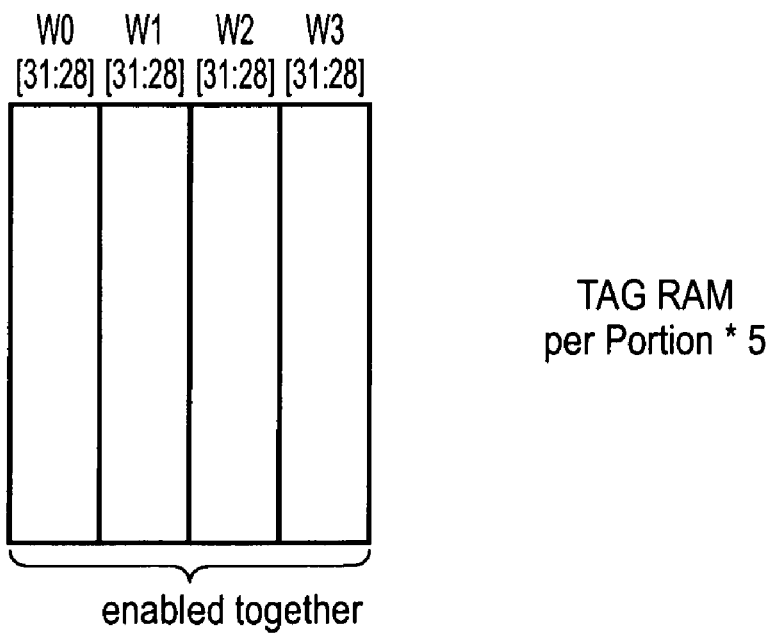

FIG. 3B illustrates an alternative arrangement in which separate TAG RAMs are provided for each portion which may be either shared or non-shared. Thus, in the example illustrated, the values for the bits [31:28] are shared by all values within the four cache ways concerned and accordingly these 4-bit portions are stored together within a single TAG RAM for that portion and thus either enabled or disabled together. This simplifies control and produces a more desirable aspect ratio for the TAG RAM. Since there will be five portions which can either be shared or non-shared in accordance with 20-bit TAGs divided into 4-bit portions, there will in example of FIG. 3B be five TAG RAMs even though this is a 4-way cache.

Figure 4:
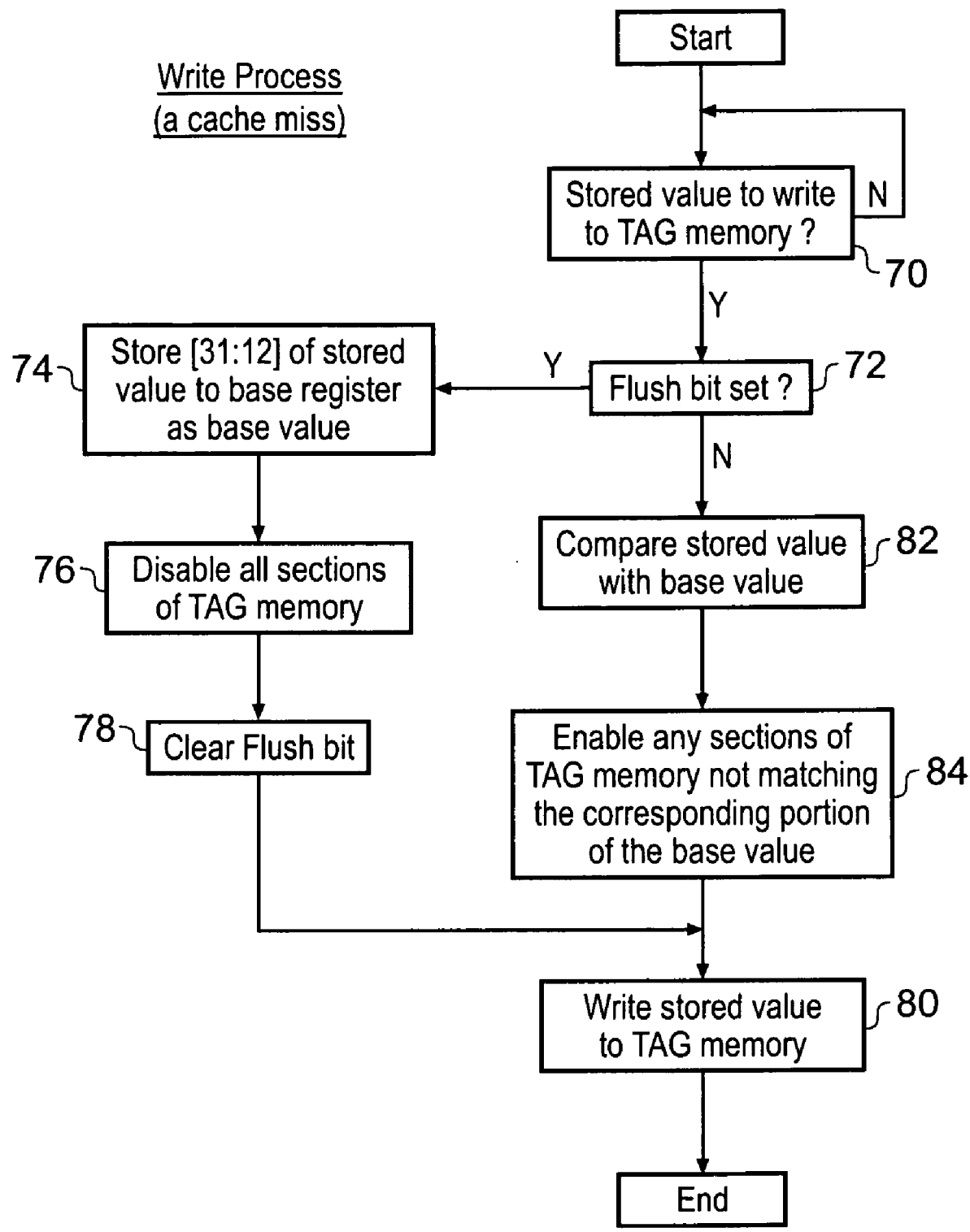
FIG. 4 is a flow diagram schematically illustrating the write process (e.g. a cache miss) to the cache memory of FIG. 1.

FIG. 4 is a flow diagram schematically illustrating the processing performed by the circuitry of FIG. 1 as part of a write process. At step 70 the process waits for a stored value to be written to memory. When such a stored value is received, step 72 determines whether a flush bit within a flush latch 74 (see FIG. 1) is set indicating that the cache memory 2 has just been flushed and accordingly contains no valid stored values. If the flush bit is set, then processing proceeds to step 74 where the upper twenty bits of the stored value (i.e. the TAG) are written into the base value register 30 to form the base value for subsequent processing (i.e. the value for which it is assumed that portions of that value will be shared by all of the stored values). Step 76 then disables all of the sections 34, 36, 38, 46, 48 of the TAG memory by setting the appropriate latches 56, 58, 60, 62, 64 since at the outset all portions of the first stored value to be written into the cache following a flush will be shared. Step 78 then clears the flush bit stored within the flush latch 74 and step 80 writes the stored value into the appropriately indexed row of the plurality of memory rows of the TAG RAM 4, 6, 8, 10.

If the determination at step 72 was that the flush bit is not set, then processing proceeds to step 82 which a comparison is made between the stored value to be written and the base value stored in the base register 30. For any portions of the stored value and base value which do not match, the corresponding sections 34, 36, 38, 46, 48 within the TAG RAMs 4, 6, 8, 10 are enabled since these will be sections which no longer share values for all of the valid TAG's stored values therein. This is performed at step 84. Thus, it will be seen that whilst initially all the sections 34, 36, 38, 46, 48 of the TAG RAM 4, 6, 8, 10 are disabled, these will be selectively enabled as further writes are made to the cache memory 2 and data stored therein when these new stored values have portions which do not match the corresponding portions of all previously stored values. Flushing the cache memory 2 normally takes place as a result of context switches and similar actions within processor operations and it is normal at this time for previously cached values no longer to be required and accordingly the behavior of the cache memory 2 to be evicted and cleared.

Figure 5:
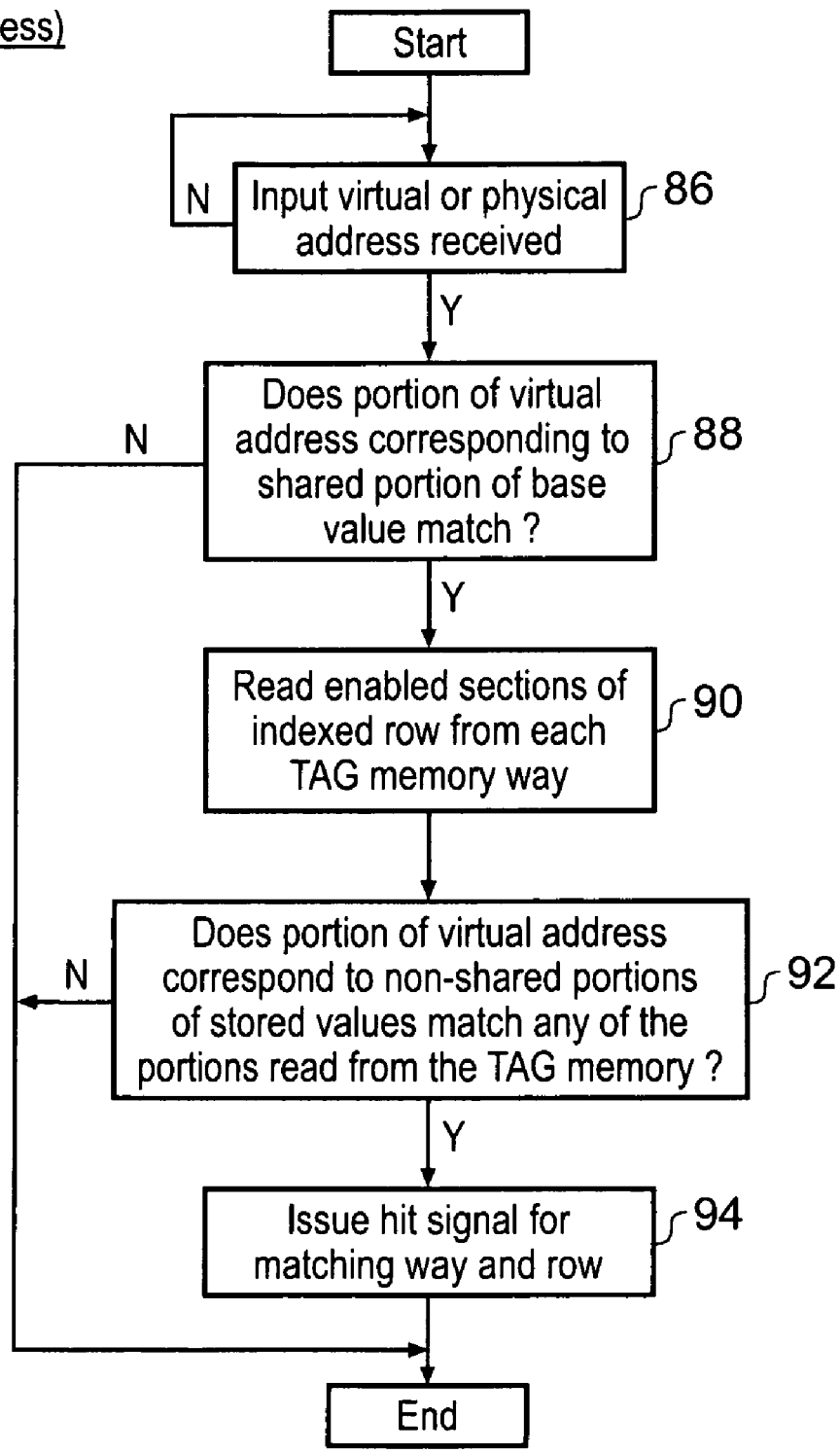
FIG. 5 is a flow diagram schematically illustrating the read process (e.g. a cache access) to the memory of FIG. 1.

FIG. 5 schematically illustrates the processing performed when reading the cache memory 2. At step 86, the cache memory 2 waits for any address to be received for reading. When such an address is received, then step 88 determines whether the portion of the address corresponding to the shared portion of the base value stored within the base register 30 matches, i.e. all the previously stored values within the cache memory share a value for that shared portion. If this condition is not met, then a miss is declared and a cache line fill will be performed under control of the write circuitry 66 with an appropriate setting of one or more of the latches 56, 58, 60, 62, 64 to indicate the now non-shared new portion or portions of the stored values.

If the comparison at step 88 indicated a match, then step 90 reads the enabled ones of the sections 34, 36, 38, 46, 48 of the TAG RAMs 4, 6, 8, 10. Since a reduced number of bits are accessed within the TAG RAMs 4, 6, 8, 10, less power is consumed. The comparison performed at step 88 by the comparator circuitry 28 with the base value stored within the base register 30 is comparatively power efficient and can use small, low power consumptions circuit elements. Step 92 determines whether the portion of the address corresponding to the non-shared portions of stored values for the indexed memory row matches any of those portions read from the respective TAG RAMs 4, 6, 8, 10. If there is no such match, then this indicates a cache miss and processing of the read again terminates with a subsequent cache line fill as described above. If the determination at step 92 was that one of the cache ways does contain a matching and non-shared portion of a stored value, then this is indicated at step 94 and an appropriate hit signal is issued to the corresponding one of the data RAM's 12, 14, 16, 18 so that the data values (cache line) corresponding to that input address can be output.

Figure 6:
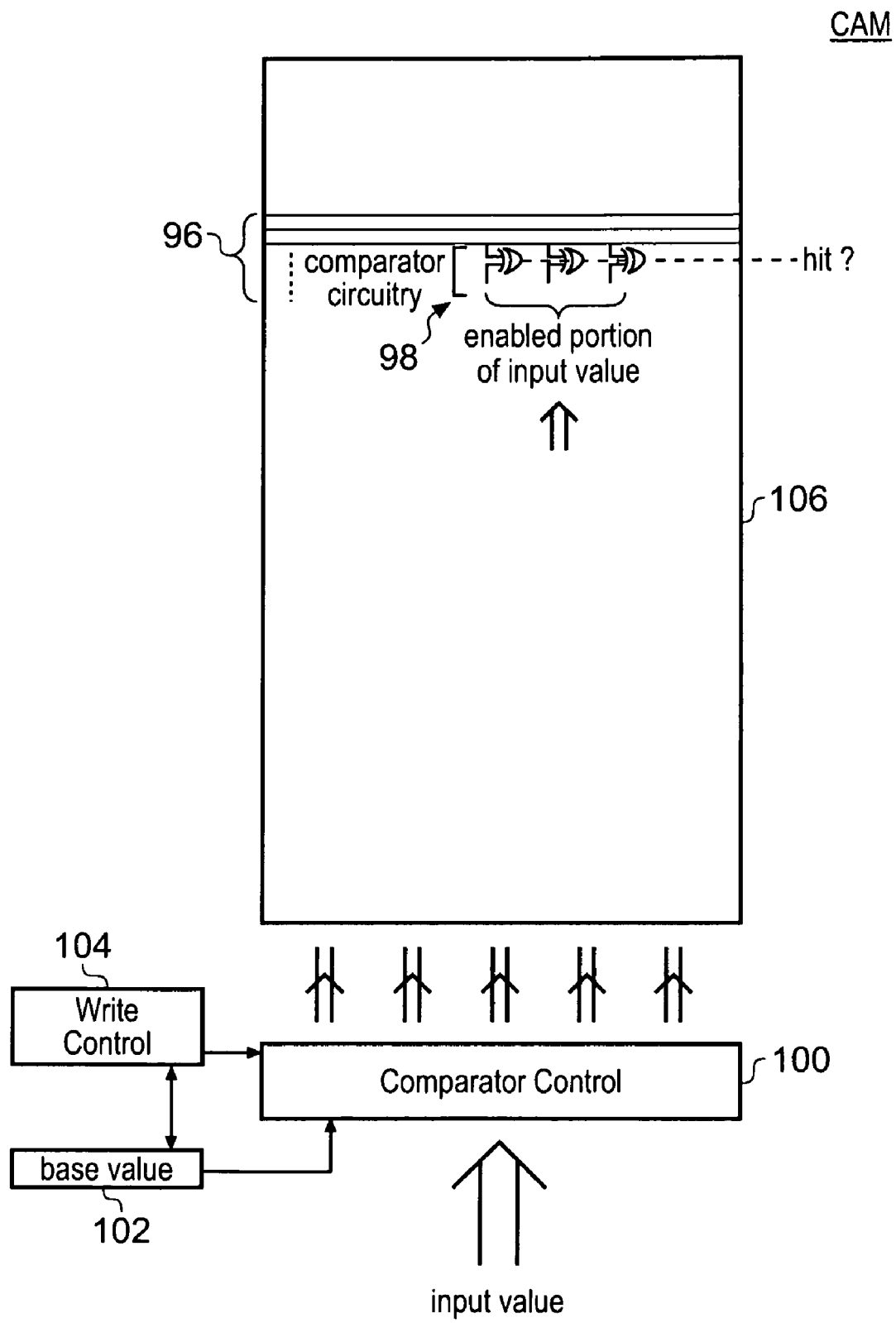
FIG. 6 schematically illustrates a CAM memory utilising the present techniques.

FIG. 6 schematically illustrates another form of memory to which the present technique can be applied. This is a general purpose content address or memory (CAM). This CAM memory contains multiple memory rows 96. An input value is compared by comparator circuitry 98 associated with each of the memory rows to determine whether the input value matches the stored value for that memory row. Portions of that comparator circuitry 98 are selectively enabled and disabled by comparator control circuitry 100 acting in conjunction with a base value register 102 storing a base value and write control circuitry 104. The base value 102 stores a base value which was the value of the first stored value to be written to the content addressable memory. When subsequent values are written to the content addressable memory under control of the write control circuitry 104, then if these share portions with all the currently stored values, then the comparator can control circuitry 100 will keep those shared portions of the comparator circuitry 98 for each memory row disabled so that only the non-shared portions will be subject to active comparison within the body of the content addressable memory 106. The comparison of the shared portions can be performed directly and more power efficiently using the base values stored within the base value register 102.

Figure 7:
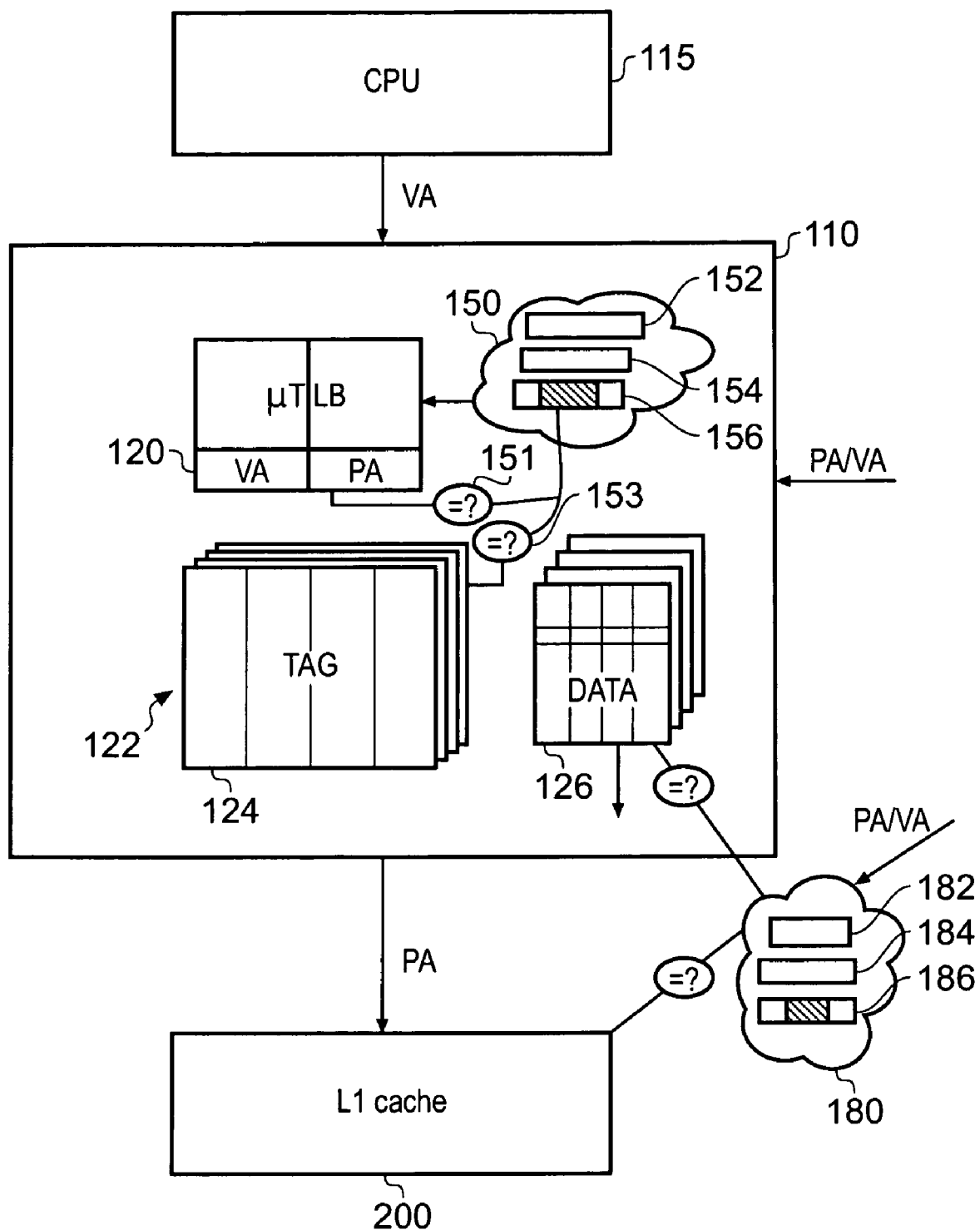
FIG. 7 shows address translation circuitry according to an embodiment of the present invention.

FIG. 7 shows address translation circuitry 110 within an MMU for translating a virtual address from a data access request received from CPU 115 to a physical address in order to access L1 cache 200. Address translation circuitry 110 comprises a small, fast fully associative μTLB 120 and a larger main TLB 122 that is slower to access and is set associative.

Figure 8:
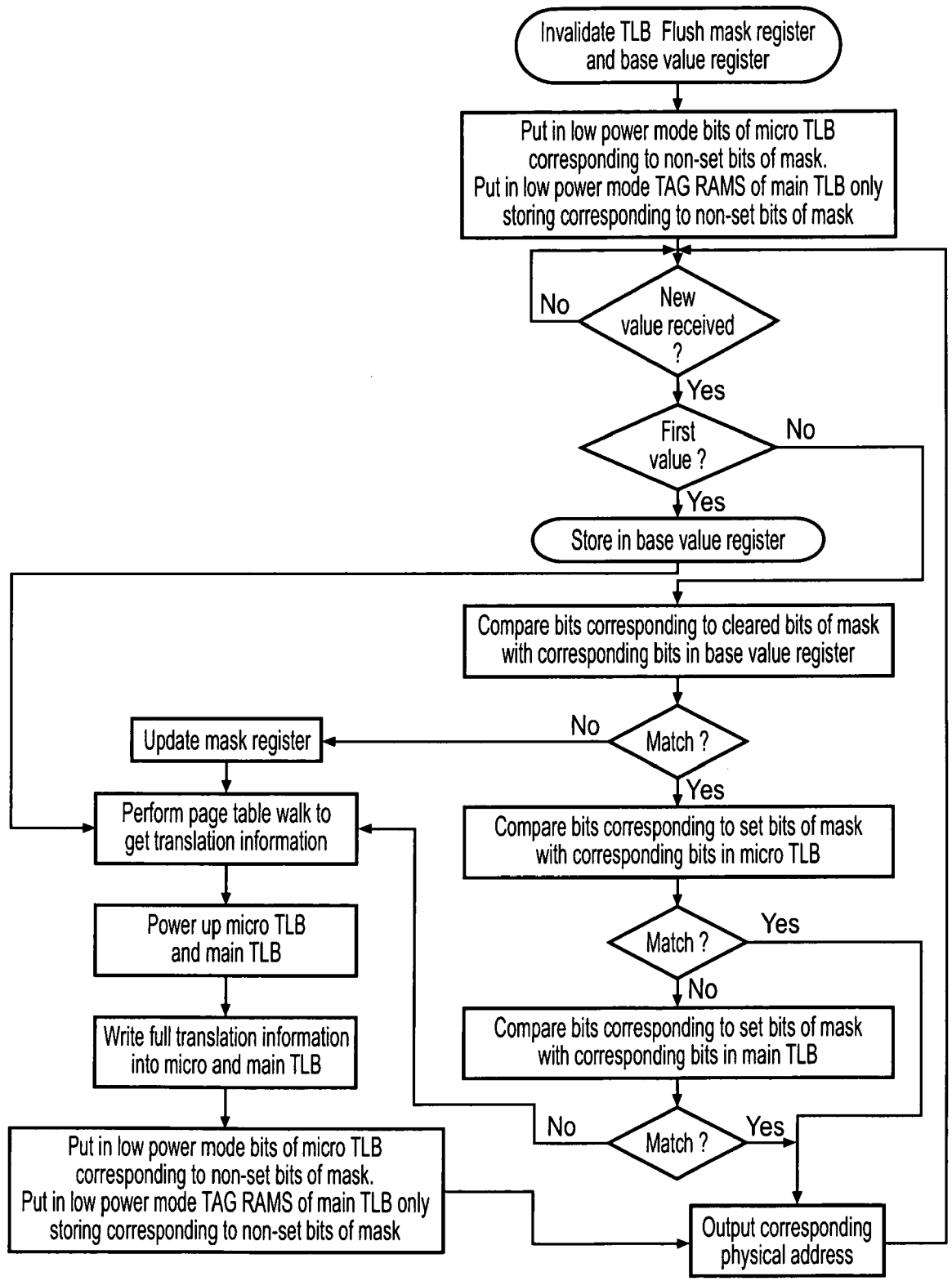
FIG. 8 is a flow diagram schematically illustrating writing to and accessing the address translation circuitry of FIG. 7.

FIG. 8 shows a flow diagram illustrating method steps for populating and accessing this TLB.

Following, for example, a task switch, the TLB is invalidated and the mask register and base value register flushed, the bits of the μTLB 120 corresponding to non-set bits of the mask (in this case all of them) and the TAG RAMS of the main TLB only storing bits corresponding to non-set bits of the mask (all of them at this point) are put in low power mode. Repopulation of the TLB then occurs.

A virtual address that is to be written to the TLB 122 (which includes μTLB 120 and main TLB 124) is received and if it is the first value to be received it is stored in base value register 154 within comparison control circuitry 150. A page table walk is then performed to retrieve the physical address and update the TLB with the virtual and physical addresses as is described in more detail below.

Following receipt of the first value when a new value is received it is placed in register 152 and bits corresponding to cleared bits of the mask are then compared with the corresponding bits in base value register 154. If there is not a match the mask register is updated by setting any bits that were not the same in the comparison of the received value and base value. A page table walk is then performed to retrieve the information required to update the TLB. The μTLB 120 and main TLB 124 are then powered up and the full translation information is written into them. The bits of the μTLB 120 corresponding to non-set bits of the mask are then placed in low power mode as are any TAG RAMS of the main TLB 124 that only store bits corresponding to non-set bits of the mask.

The corresponding physical address retrieved from the page table walk is then output.

A new value is then received and bits corresponding to cleared bits of the mask are compared with corresponding bits in base value register. In response to a match, the other bits of the received value, i.e. those corresponding to the set bits of the mask are compared with corresponding bits in the μTLB 120, if there is a match, then the value is stored in the μTLB 120 and the corresponding physical address can be output. If there is no match then the main TLB 124 is checked and if there is a match of the set bits and a value in the main TLB then the corresponding physical address is output. If not a page table walk is required to get the translation information and this is performed and the μTLB 120 and main TLB 124 are updated. In this case the mask register will not need to be updated as there was a match with the cleared bits of the mask.

The next value is then received and a comparison made and perhaps further bits will be identified as not being the same and thus, will be set in the mask register 156, with those already set left as such. Thus, the number of set bits can only increase, bits that are already set remaining set unless the register is flushed.

Mask register 156 can then be used during accesses to the TLB to disable bits in the TLB that correspond to the non-set bits in this register. This is because these bits correspond to the "shared" portion of the virtual addresses stored, i.e. the portion of the virtual address that is the same for all the virtual addresses already stored in the TLB and the same as the value in the base value register. Thus, in any data access request these bits do not need to be involved in the comparison as the corresponding bits from the base value register can be used instead. A comparison with a value in a register generally requires less energy than a comparison with a value stored in say a RAM. Furthermore, the RAM could be placed into a low power state when it is not being used which can further reduce power consumption.

As μTLB 120 is formed of flops then these devices can be disabled individually so that all bits corresponding to shared bits can be removed from the comparison. The unused logic can be placed in a low power state to reduce power consumption. The main TLB 124 in this embodiment consists of a 4-way set associative TAG cache and a corresponding 4-way data cache. Each of the 4 ways of the TAG cache are divided into separate RAMs each storing different portions of the virtual address. Such an arrangement is shown in more detail in FIG. 9. Mask 156 is used to disable any of the RAMs that store a portion of the address that lies solely within the shared portion (corresponding to non-set bits). Thus, these RAM(s) are not used in any of the comparisons.

When a data access request comprising a virtual address is received from, for example the CPU 115, it is first compared using a comparator 151 with values stored in the μTLB 120 to see if it is stored in there. This is done by comparing the portion of the virtual address corresponding to the set bits of mask 156 with the corresponding portion of the virtual addresses stored in μTLB 120, and by comparing the other portion with the corresponding bits stored in base value register 154. If a match to both is found then the corresponding physical address is output.

If no match is found in the μTLB 120 then the main TLB 122 is consulted. A comparison using comparator 153 is made with the input value and the corresponding portion of the values stored in the enabled RAMS. If a match is found the physical address from the corresponding data RAM 126 is then output, assuming a match was found with the other portion of the address and the base value register.

If no match is found, an entry will be invalidated and a new entry will be fetched and written into the TLB 122.

If a task switch occurs then the virtual addresses in the TLB may need updating. At such a point entries in the TLB are marked as invalid and it is repopulated. At this point the mask register 156 and base value register 154 are flushed.

When the TLB is updated physical addresses are written to the data RAM 126 and physical address portion of μTLB 120 as well as virtual addresses being written to the TAG RAMS and virtual address portion of μTLB 120. If not all of the possible physical address range is used then portions of the physical address will also be shared and have common values and thus, energy can be saved in these accesses too if comparison circuitry 180 that is essentially the same as comparison circuitry 150, is used.

Comparison control circuitry 180 comprises a register 182 to store physical addresses to be written to the data RAM 126, register 184 for storing a base value which generally corresponds to the first physical address to be written to the TLB and a mask register 186 for storing bits indicating corresponding bits of the stored physical addresses that are not shared with all physical addresses that are stored in the TLB.

Mask 186 can be used to disable the bits in the physical address data RAM not corresponding to the set bits in the mask in a similar way to the way mask 156 is used. If this RAM is arranged in a similar way to TAG RAM then it may be that individual narrow RAMs are disabled.

In this embodiment comparison control circuitry 180 is shown as being remote from address translation circuitry 110, although in some embodiments it may be within it (as comparison control circuitry 150 for the virtual addresses is). It is remote from it in this embodiment as this circuitry is also used to improve the efficiency of the L1 cache look up. This is because the present invention recognises that if certain portions of the physical addresses are shared these portions will be the same for the TLB and the L1 cache and thus, the same circuitry can be used to disable the shared portions of the physical address in both the TLB and the L1 cache. Thus, mask 186 can be used to disable shared portions of the physical address such that they are not used in the comparison, bits from base value register 184 being used instead.

Figure 9:
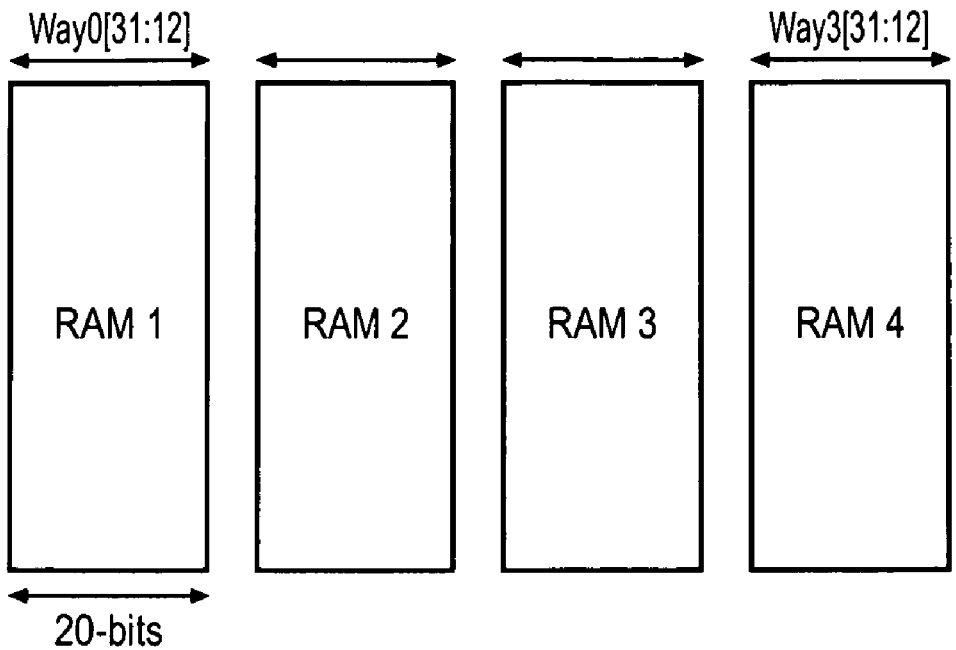
FIG. 9 shows multiple TAG RAMs similar to those used in the apparatus of FIG. 7.
Figure 9:
Figure 9:
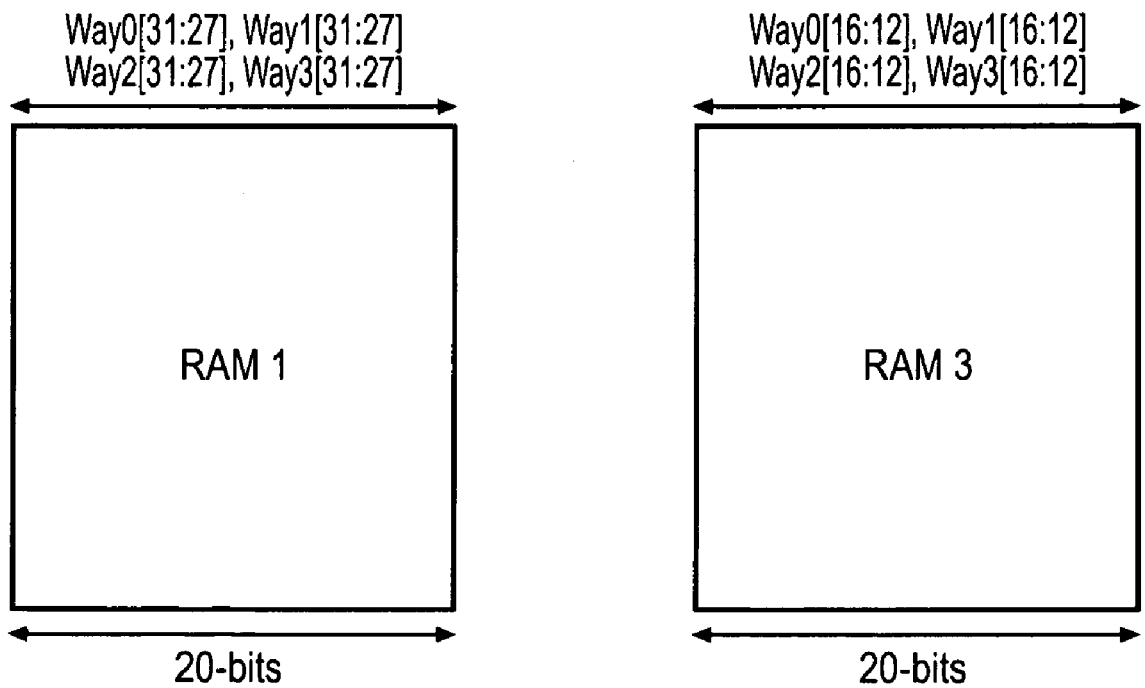

FIG. 9 shows an example of TAG RAMs that have been split into four separate RAMs. Access to each of the RAMs can be enabled or disabled as required. It should be noted that using multiple narrow RAMs in this way does not affect gate count. In this embodiment, rather than placing a complete tag in each way, the tags are spilt into portions relating to their address. Thus, address slices from each way may be merged with the other ways. So instead of RAM 1 containing bits 31 to 12 of way 0 it contains bits 31 to 27 of way 0, bits 31 to 27 of way 1 and so on. The address comparison logic can then determine from the input virtual address and the mask whether the relevant address slice is a shared portion, in other words fixed to a specific value, or a non-shared portion. For portions of the address that are shared the associated RAM need not be accessed and thus can be placed in low power mode. The slice of the address corresponding to this RAM can instead be provided from base value register. Thus, the RAMs containing at least some of the non-shared portion of the address are enabled and a comparison is made.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. Data store access circuitry comprising:
a data store for storing values;
comparator circuitry coupled to said data store and responsive to receipt of a data access request comprising an address to compare at least a portion of said address with at least a portion of one or more of said values stored in said data store so as to identify a stored value matching said address;
a base value register coupled to said comparator circuitry and storing a base value corresponding to at least a portion of at least one of said stored values; and
comparator control circuitry coupled to said comparator circuitry to control:
(i) which portion of said address is processed as a non-shared portion and compared by said comparator circuitry with non-shared portions of said one or more stored values stored in said data store; and
(ii) which portion of said address is processed as a shared portion and compared by said comparator circuitry with a shared portion of said base value stored in said base value register; wherein
said shared portion of said base value has a value matching corresponding portions of all of said stored values stored within said data store,
write circuitry coupled to said data store to write respective stored values;
a mask register for storing a mask value; and wherein
said comparator control circuitry comprises a comparator and said comparator control circuitry is responsive to receipt of each stored value being written to said data store to compare said address with said base value and to update said mask value by adding identifiers to said mask value identifying any bits of said address and base value that do not match;
said comparator control circuitry determining said non-shared portion as said portion corresponding to said identifiers of said mask and said shared portion of said address as said portion corresponding to said other portion of said mask.

2. Data store access circuitry according to claim 1, wherein said comparator control circuitry is within said comparator circuitry.

3. Data store access circuitry as claimed in claim 1, wherein said data store comprises a plurality of rows, each of said plurality of rows being divided into a plurality of multi-bit portions, each of said plurality of multi-bit portions being processed as storing either a shared stored value or a non-shared stored value for all of said plurality of rows.

4. Data store access circuitry as claimed in claim 3, wherein said comparator control circuitry selectively disables a multi-bit portion of all of said plurality of rows from being subject to a comparison by said comparator circuitry and being read when said multi-bit portion of all of said plurality of rows corresponds to at least a part of said shared portion of said base value.

5. Data store access circuitry as claimed in claim 1, wherein said data store is part of a cache memory.

6. Data store access circuitry as claimed in claim 5, wherein said data store is a cache TAG memory.

7. Data store access circuitry as claimed in claim 5, wherein said cache memory is a multi-way cache memory with a TAG memory for each cache way.

8. Data store access circuitry as claimed in claim 7, wherein said cache TAG memory comprises a plurality of rows, each of said plurality of rows being divided into a plurality of RAMS, each of said plurality of RAMs storing a same predetermined portion of a plurality of TAGs and each being processed as storing either a shared stored value or a non-shared stored value for all of said plurality of rows, wherein a RAM is identified as storing a non-shared stored value if any bits of said stored value are non-shared bits;
said comparator control circuitry being configured to selectively disable at least one RAM from being subject to a comparison by said comparator circuitry and being read when said at least one RAM is identified as storing shared stored values.

9. Data store access circuitry according to claim 8, wherein said comparator control circuitry selectively disables said at least one RAM by switching said RAM to low power mode where data is not lost.

10. Data store access circuitry as claimed in claim 1, wherein said base value and mask are cleared when said data store is flushed.

11. Data store access circuitry as claimed in claim 10, wherein said base value is set to match a first stored value written to said data store following a flush.

12. Data store access circuitry as claimed in claim 6, wherein said cache memory is a virtually addressed cache memory and said cache TAG memory stores virtual address TAGs.

13. Data store access circuitry as claimed in claim 12, wherein said data store access circuitry comprises address translation circuitry for translating an address in response to access requests targeting virtual addresses, said virtually addressed cache memory comprising a plurality of data caches for storing a plurality of at least a portion of physical addresses in locations identified by at least a portion of a virtual address.

14. Data store access circuitry according to claim 1, wherein said data store access circuitry comprises address translation circuitry for translating virtual addresses to physical addresses in response to access requests targeting virtual addresses, said data store comprising logic for storing said one or more values, said one or more values comprising at least a portion of one or more physical addresses; wherein
said address translation circuitry is adapted to disable read access to said data store logic storing said shared portion of said one or more values.

15. Data store access circuitry as claimed in claim 14, wherein said address translation circuitry is adapted to disable a data path for storing and accessing said shared portion of said one or more values.

16. Data store access circuitry according to claim 15, wherein said address translation circuitry selectively disables said data path by switching logic forming said data path to low power mode.

17. Data store access circuitry according to claim 14, wherein said data store access circuitry is responsive to said data store being invalidated to clear said base value.

18. Memory management circuitry comprising:
a memory management unit comprising address translation circuitry for translating a received virtual address to a physical address comprising a translation lookaside buffer comprising a plurality of physical addresses stored in locations indicated by a corresponding plurality of virtual addresses;
write circuitry coupled to said translation lookaside buffer to write respective stored physical addresses; and
comparator control circuitry coupled to said memory management unit said comparator control circuitry comprising:
a mask register for storing a mask value;
a base value register for storing a base value corresponding to one of said stored physical addresses;
a comparator;
said comparator control circuitry being responsive to receipt to each stored physical address being written to said data store to compare said address with said base value and to update said mask value by adding identifiers to said mask value identifying any bits of said address and base value that do not match;
said comparator control circuitry determining a non-shared portion of said physical address as said portion corresponding to said identifiers of said mask and said shared portion of said address as said portion corresponding to said other portion of said mask;
said memory management unit being responsive to a read request to read said non-shared portion of said physical address and to output said non-shared portion.

19. Memory management circuitry according to claim 18, wherein said comparator control circuitry is within said memory management unit.

20. A memory coupled to memory management circuitry according to claim 18, said memory comprising an input for receiving said non-shared portion of said physical address from said memory management circuitry and said mask value and base value from said comparator control circuitry and comprising:
comparator circuitry coupled to said memory and responsive to receipt of said non-shared portion of said physical address to compare said received portion of said physical address with a corresponding portion of one or more of said values stored in said data store so as to identify a stored value matching said physical address.

21. A method of accessing a data store for storing values, said data store having a base value register coupled thereto for storing a base value corresponding to at least a portion of at least one of said stored values, said method comprising the steps of:
receiving a data access request comprising an address;
determining which portion of said address is to be processed as a non-shared portion and compared by said comparator circuitry with non-shared portions of said one or more stored values stored in said data store and which portion of said address is processed as a shared portion and compared by said comparator circuitry with a shared portion of said base value stored in said base value register, said shared portion of said base value has a value matching corresponding portions of all of said stored values stored within said data store;
comparing said non-shared portion of said address with a corresponding portion of one or more of said values stored in said data store so as to identify a stored value matching said address; and
comparing said shared portion of said address with said corresponding portion of said base value stored in said base value register,
writing respective stored values to said data store;
comparing each value written to said data store with said base value and updating a mask value by adding identifiers to said mask value identifying any bits of said address and base value that do not match;
said step of determining said non-shared and shared portions comprising identifying said non-shared portion of said address as said portion corresponding to said identifiers of said mask and said shared portion of said address as said portion corresponding to said other portion of said mask.

* * * * *